United States Patent
de Haas

(10) Patent No.: US 11,476,887 B2
(45) Date of Patent: Oct. 18, 2022

(54) CONTROLLER AREA NETWORK CONTROLLER AND TRANSCEIVER

(71) Applicant: NXP B.V., Eindhoven (NL)

(72) Inventor: Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 10 days.

(21) Appl. No.: 17/248,226

(22) Filed: Jan. 14, 2021

(65) Prior Publication Data
US 2021/0226661 A1 Jul. 22, 2021

(30) Foreign Application Priority Data
Jan. 21, 2020 (EP) .................... 20152926

(51) Int. Cl.
*H04B 1/40* (2015.01)
*H04L 12/40* (2006.01)

(52) U.S. Cl.
CPC ............ *H04B 1/40* (2013.01); *H04L 12/40* (2013.01); *H04L 2012/40215* (2013.01)

(58) Field of Classification Search
CPC .. H04B 1/40; H04L 12/40; H04L 2012/40215
See application file for complete search history.

(56) References Cited

U.S. PATENT DOCUMENTS

| 9,300,323 | B2 * | 3/2016 | Hartwich | H04L 12/417 |
| 10,824,583 | B2 | 11/2020 | Muth et al. | |
| 10,906,398 | B2 * | 2/2021 | Ricci | B60K 37/06 |
| 2013/0034132 | A1 | 2/2013 | Kaneko et al. | |
| 2014/0245046 | A1 * | 8/2014 | Itou | G06F 1/3209 |
| | | | | 713/323 |
| 2019/0385057 | A1 * | 12/2019 | Litichever | H04L 63/14 |
| 2021/0334232 | A1 * | 10/2021 | Islinger | G06F 13/409 |

FOREIGN PATENT DOCUMENTS

| CN | 13285858 A | * | 8/2020 | ............ H04L 12/40 |
| WO | 2019234414 A1 | | 12/2019 | |

OTHER PUBLICATIONS

Visan, D. A. et al. "Line Encoder with Serial Data Transmission for Automotive Applications", 2017 IEEE 23rd International Symposium for Design and Technology in Electronic Packaging, pp. 349-352 (Oct. 2017).

* cited by examiner

*Primary Examiner* — Freshteh N Aghdam

(57) ABSTRACT

A Controller Area Network, CAN, transceiver configured to be connected to a CAN bus comprising;
a transmitter arrangement configured to transmit signalling on the CAN bus based on transmit data, configured to operate in a first or second transmission mode, the first transmission mode configured to transmit said signalling with a first property and the second transmission mode configured to transmit said signalling with a second, different, property;
a receiver arrangement configured to receive signalling from the CAN bus;
a receive output configured to provide received data to the CAN controller; and
wherein the transmitter arrangement is configured to operate in one of the first or second transmission modes based on a determination that the transmit data is encoded with a first line code and otherwise operate in the other transmission modes, and wherein the transceiver includes a decoder configured to decode the first line code of the transmit data.

15 Claims, 5 Drawing Sheets

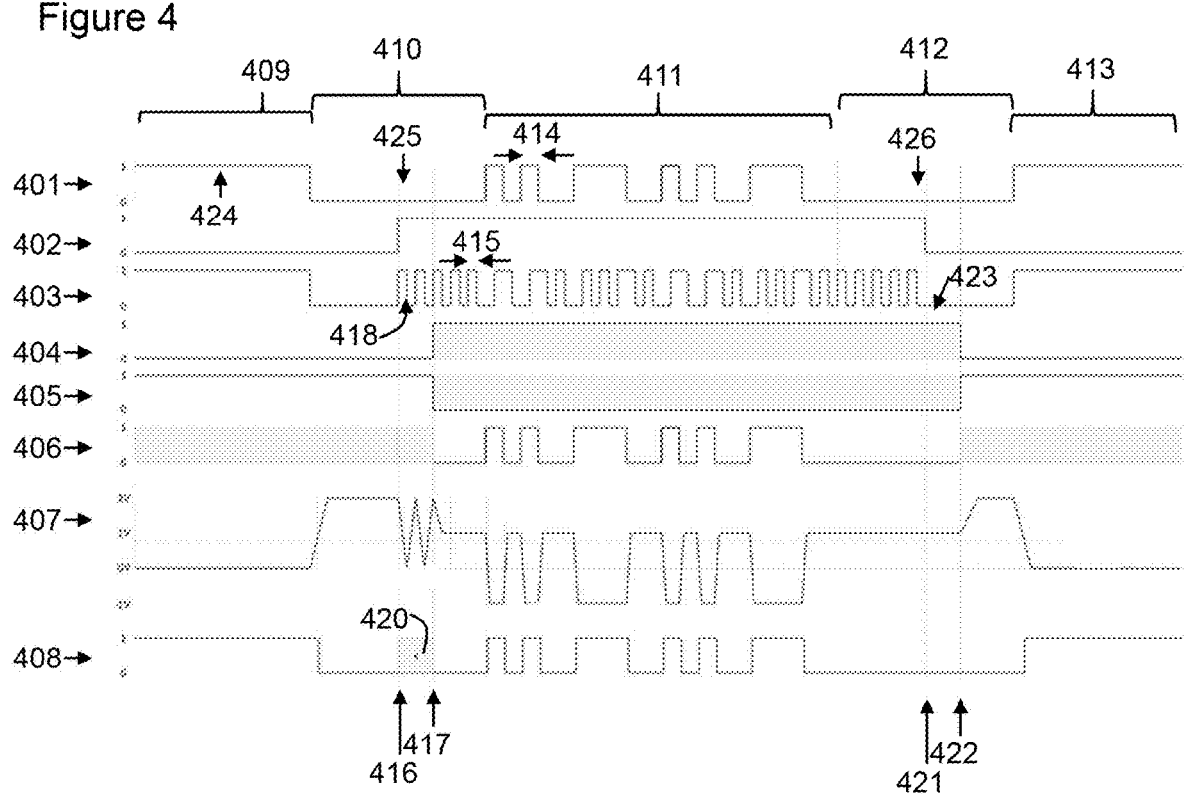
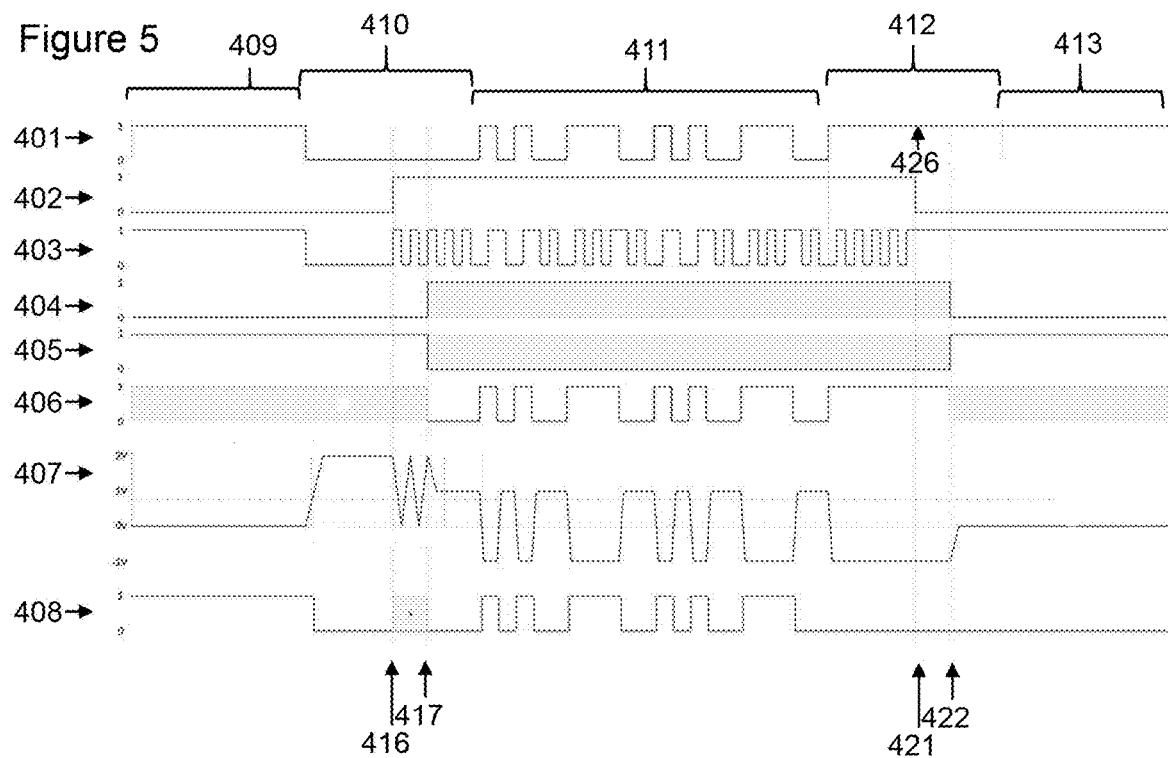

CONTROLLER AREA NETWORK CONTROLLER AND TRANSCEIVER

CROSS-REFERENCE TO RELATED APPLICATIONS

This application claims the priority under 35 U.S.C. § 119 of European patent application no. 20152926.0, filed on Jan. 21, 2020, the contents of which are incorporated by reference herein.

FIELD

The present disclosure relates to a controller area network (CAN) node. It also relates to a CAN controller and a CAN transceiver of such a node and an apparatus comprising a CAN network and method of operating the controller or transceiver.

BACKGROUND

CAN networks provide communication between nodes over a bus. Nodes that are connected to the bus can transmit to and receive data from other nodes that are connected to the bus. A CAN network implements the CAN protocol for defining the communication between the nodes.

SUMMARY

According to a first aspect of the present disclosure there is provided a Controller Area Network, CAN, transceiver configured to be connected to a CAN bus comprising:
 a transmit input configured to receive transmit data from a CAN controller for transmission on the CAN bus;
 a transmitter arrangement configured to transmit signalling on the CAN bus based on said transmit data, the transmitter arrangement comprising at least one transmitter configured to operate in a first transmission mode or a second transmission mode, wherein in the first transmission mode the transmitter arrangement is configured to transmit said signalling with a first property and when the transmitter arrangement is in the second transmission mode the transmitter arrangement is configured to transmit said signalling with a second property, different to the first property;
 a receiver arrangement configured to receive signalling from the CAN bus;
 a receive output configured to provide received data to the CAN controller based on the received signalling; and
 wherein the transmitter arrangement is configured to operate in one of the first or second transmission modes based on a determination that the transmit data is encoded with a first line code and configured to operate in the other of the first or second transmission modes based on a determination that the transmit data is not encoded with the first line code, and wherein the transceiver includes a decoder configured to decode the first line code of the transmit data and provide the decoded transmit data to the transmitter arrangement to provide for said transmission of the signalling on the CAN bus at least when the transmitter arrangement is in said one of the first or second transmission modes.

In one or more embodiments, the transceiver is configured to operate in the first transmission mode based on the determination of the presence of the first line code encoding on the transmit data.

In one or more examples, the first property and the second property comprise one or more of:
 a first baud rate (e.g. average baud rate) used to transmit said signalling and a second baud rate (e.g. average baud rate) used to transmit said signalling respectively, wherein the first baud rate is greater than the second baud rate;
 a first voltage level scheme used to represent logic one and logic zero in the signalling and a second voltage level scheme used to represent logic one and logic zero in the signalling respectively, wherein voltage levels of the first voltage level scheme differ to the voltage levels of the second voltage level scheme.

In one or more embodiments, the first line code comprises a code which gives the transmit data shorter pulse widths than said transmit data that is not encoded with the first line code.

In one or more examples, first line code comprises one of Manchester code; Return-to-Zero, RZ, code; and differential Manchester code.

Thus, for the period of time in which the transmit data is encoded with the first line code, the transceiver operates in the first transmission mode excluding any mode-change-time required to detect the presence or absence of first line code encoded transmit data, and, for the period of time in which the transmit data is not encoded with the first line code, the transceiver operates in the second transmission mode excluding any mode-change-time required to detect the presence or absence of the first line code encoded transmit data. The use and the persistence of different encoding of the transmit data to signal the desired transmission mode for the transceiver may provide a reliable signalling method because the signalling of the desired mode is continuous rather than by way of an encoded "trigger message".

In one or more embodiments, said transceiver is configured to determine whether or not the transmit data is encoded by the first line code by measuring one or more pulse widths of the transmit data and, if the pulse width is below a threshold time, the transmitter arrangement is configured operate in the first transmission mode and, if the pulse width is above the threshold time, the transmitter arrangement is configured operate in the second transmission mode.

In one or more embodiments, the transceiver comprises a mode detector configured to determine the presence or absence of the first line code encoding of the transmit data and provide a mode-switch signal to the transmitter arrangement to select either the first transmission mode or the second transmission mode.

In one or more embodiments, the mode detector is configured to determine; a logic-low-time comprising the length of time the transmit data was logic low since the last logic high; and
 a logic-high-time comprising the length of time the transmit data was logic high since the last logic low; and wherein
 the mode detector is configured to, based on the logic-low-time being longer than a first time threshold and the logic-high-time being shorter than a second time threshold, the second time threshold less than that first time threshold, provide the mode-switch signal to the transmitter arrangement to select the first transmission mode; and
 the mode detector is configured to, based on the logic-low-time being longer than the first time threshold and/or the logic-high-time being longer than the first time threshold, provide the mode-switch signal to the transmitter arrangement to select the second transmission mode.

In one or more embodiments, the mode detector is configured to provide the mode-switch signal to the receiver arrangement to select either a first receive mode in which the receiver arrangement is configured to receive signalling having the first property, and a second receive mode in which the receiver arrangement is configured to receive signalling having the second property different to the first property; and
  wherein the mode detector is configured to determine; a
    logic-low-time comprising the length of time the transmit data was logic low since the last logic high; and
  a logic-high-time comprising the length of time the transmit data was logic high since the last logic low; and wherein
  the mode detector is configured to, based on the logic-high-time being longer than a first time threshold and the logic-low-time being less than a second time threshold, the second time threshold less than that first time threshold, provide the mode-switch signal to the receiver arrangement to select the first receive mode and provide the mode-switch signal to the transmitter arrangement to disable the transmitter arrangement; and
  the mode detector is configured to, based on the logic-low-time being longer than the first time threshold and/or the logic-high-time being longer than the first time threshold, provide the mode-switch signal to the transmitter arrangement to select the second transmission mode and the second receive mode.

In one or more examples, the receiver arrangement comprises at least one receiver configured to operate in the first receive mode or the second receive mode.

In one or more examples, the first time threshold is based on the longest pulse width possible that is representative of a single logic value in the transmit data when the first line code is used and may comprise the longest pulse width possible that is representative of a single logic value in the transmit data using the first line code plus a tolerance time. In one or more examples, the second time threshold is based on the longest pulse width possible that is representative of a single logic value in the transmit data using the first line code and may comprise the longest pulse width possible that is representative of a single logic value in the transmit data using the first line code minus a tolerance time, which may or may not be the same as the tolerance time used in the determination of the first time threshold.

In one or more embodiments, the transmitter arrangement comprises a first transmitter configured to transmit signalling with said first property and a second transmitter configured to transmit signalling with said second property, wherein the mode-switch signal is configured to, in the first transmission mode, enable the first transmitter and disable the second transmitter, and, in the second transmission mode, disable the first transmitter and enable the second transmitter.

In one or more examples, the first transmitter is configured to transmit said signalling with a first voltage level scheme to represent logic high and logic low and the second transmitter is configured to transmit said signalling with a second voltage level scheme to represent logic high and logic low different to the first voltage level scheme.

In one or more embodiments, the receiver arrangement comprises a first receiver configured to receive signalling with said first property and a second receiver configured to receive signalling with said second property, wherein the mode-switch signal is configured to, in the first receive mode, enable the first receiver and disable the second receiver in the provision of the received data to the receive output, and, in the second receive mode, enable the second receiver and disable the first receiver in the provision of the received data to the receive output.

In one or more examples, the first receiver is configured to receive said signalling with a first voltage level scheme to determine logic high and logic low and the second receiver is configured to receive said signalling with a second voltage level scheme to determine logic high and logic low different to the first voltage level scheme.

According to a second aspect of the present disclosure we provide a Controller Area Network, CAN, controller configured to be connected to a CAN bus connected CAN transceiver, the CAN controller comprising:
  a transmit output configured to provide transmit data to the CAN transceiver for transmission on the CAN bus;
  a receive input configured to receive received data from the CAN transceiver representative of received signalling from the CAN bus; and
  a mode selector configured to provide a controller mode signal that instructs the CAN transceiver to operate in a first transmission mode rather than a second transmission mode, wherein the controller mode signal is provided by:
  the controller being configured to provide for the encoding of the transmit data with a first line code to instruct the CAN transceiver to operate in one of the first or second transmission modes and, otherwise, the controller being configured to provide for the non-encoding of the transmit data with the first line code to instruct the CAN transceiver to operate in the other of the first or second transmission modes.

In one or more embodiments, the first line code comprises a code in which the first line coded transmit data has shorter pulse widths than said transmit data that is not encoded with the first line code when using the same transmit data baud rate, such as the first baud rate.

In one or more embodiments, the CAN controller is configured to provide the controller mode signal during a CAN transition bit which defines the transition between an arbitration phase of the CAN protocol and a data phase of the CAN protocol and wherein the controller mode signal is provided for a period less than the time of the CAN transition bit and greater than the time for at least two or at least four logic level transitions of the transmit data that is encoded with a first line code.

In one or more embodiments, the transmit data that is not encoded with the first line code is encoded as non-return-to-zero, NRZ, code.

According to a third aspect of the present disclosure, we provide an apparatus comprising a Controller Area Network, CAN, comprising a plurality of nodes, each node comprising the CAN transceiver of the first aspect connected with a CAN controller of the second aspect such that the transmit output of the CAN controller is coupled with the transmit input of the CAN transceiver and the receive output of the CAN transceiver is coupled with the receive input of the CAN controller.

According to a fourth aspect of the disclosure we provide a method of operating a Controller Area Network, CAN, transceiver configured to be connected to a CAN bus, the transceiver comprising a transmitter arrangement configured to transmit signalling on the CAN bus based on transmit data received by the transceiver, the transmitter arrangement comprising at least one transmitter configured to operate in a first transmission mode or a second transmission mode, wherein in the first transmission mode the transmitter arrangement is configured to transmit said signalling with a first property and in the second transmission mode the transmitter arrangement is configured to transmit said signalling with a second property different to the first property; and a receiver arrangement configured to receive signalling from the CAN bus and a receive output configured to provide received data to the CAN controller based on the received signalling and a decoder; the method comprising:

receiving transmit data from a transmit input for transmission on the CAN bus;

operating the transmitter arrangement in one of the first or second transmission modes based on a determination that the transmit data is encoded with a first line code, and decoding the first line code of the transmit data and providing the decoded transmit data to the transmitter arrangement to provide for said transmission of the signalling on the CAN bus; and operating the transmitter arrangement in the other of the first or second transmission modes based on a determination that the transmit data is not encoded with the first line code.

According to a fifth aspect of the present disclosure we provide a method of operating a Controller Area Network, CAN, controller configured to be connected to a CAN bus connected CAN transceiver, the CAN controller comprising a transmit output configured to provide transmit data to the CAN transceiver for transmission on the CAN bus; a receive input configured to receive received data from the CAN transceiver representative of received signalling from the CAN bus; and a mode selector configured to provide a controller mode signal that instructs the CAN transceiver to operate in a first transmission mode rather than a second transmission mode, wherein the method comprises providing the controller mode signal by providing for the encoding of the transmit data with a first line code to instruct the CAN transceiver to operate in one of the first or second transmission modes and, otherwise, providing the controller model signal by providing for the non-encoding of the transmit data with the first line code to instruct the CAN transceiver to operate in the other of the first or second transmission modes.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 4 shows a first example timing diagram illustrating a transition from a second, slow transmission mode to a first, fast transmission mode and back to the second, slow, transmission mode;

FIG. 5 shows a second example timing diagram illustrating a transition from a second, slow, transmission mode to a first, fast, transmission mode and back to the second, slow, transmission mode;

DETAILED DESCRIPTION

A Controller Area Network, CAN, typically comprises a plurality of nodes each connected to a two wire CAN bus. The nodes can communicate with each other by sending and receiving signalling to and from the CAN bus.

Figure 1:
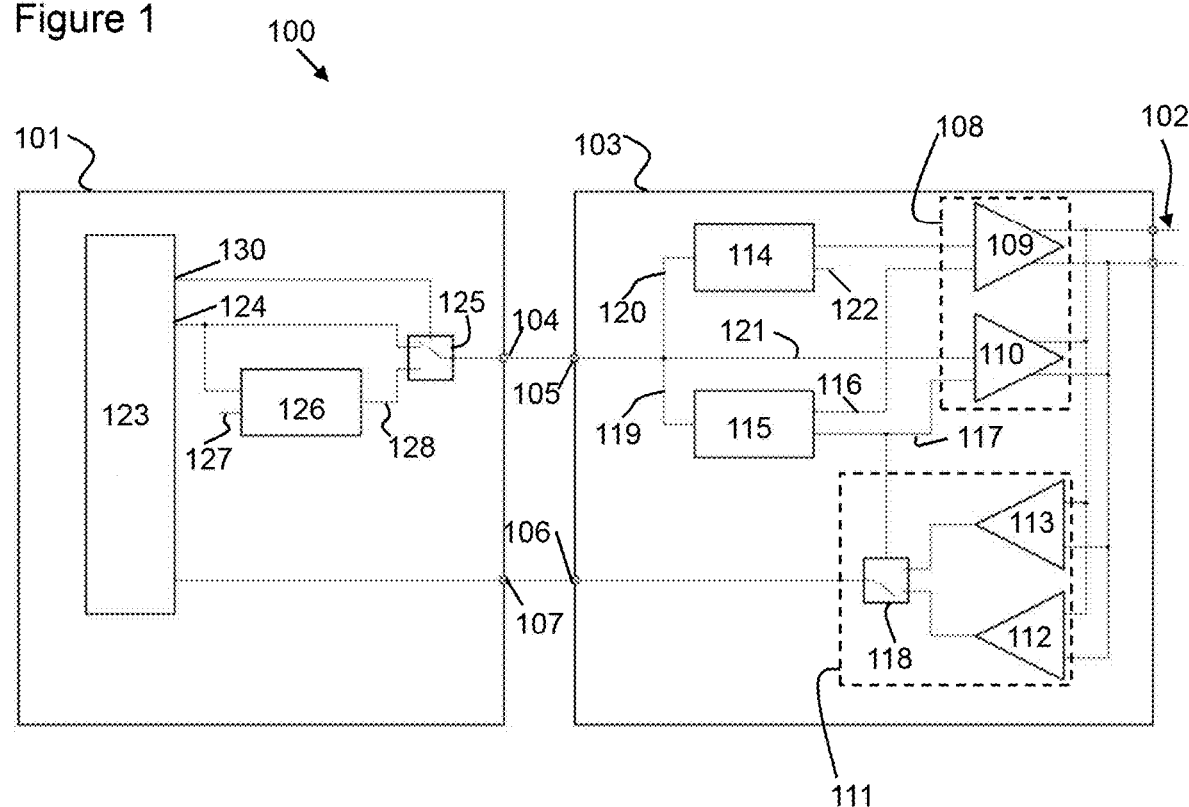
FIG. 1 shows an example embodiment of a CAN controller coupled with a CAN transceiver.

FIG. 1 shows an example node 100. The node includes a CAN controller 101, such as a microcontroller. The CAN controller 101 may have the CAN protocol embedded therein, such as in a controller module. The CAN controller 101 provides and receives signalling from the CAN bus 102 using a CAN transceiver 103. The CAN transceiver 103 therefore typically provides signalling to the CAN bus based on transmit data received from the CAN controller 101 and provides data to the CAN controller 101 based on signalling it receives from the CAN bus 102. The CAN transceiver 103 may be configured to provide the signalling to the CAN bus 102 with the appropriate voltage levels for logic high and logic low based on the transmit data and with the appropriate differential signalling for the two-wire CAN bus according to the CAN protocol.

Reference to a CAN transceiver or a CAN controller herein may be understood as a controller and transceiver that implements, at least in part, the CAN protocol in full or in part or the CAN FD protocol in full or in part. The functionality described for the CAN transceiver or CAN controller herein may comprise increased functionality above what is currently defined in the CAN protocol.

The CAN controller 101 is configured to provide transmit data at a transmit output 104 for receipt at a transmit input 105 of the CAN transceiver 103. The transmit output 104 and transmit input 105 may comprise integrated circuit pins. Thus, the transmit input pin 105 is configured to receive transmit data from the CAN controller 101. The CAN transceiver 103 is configured to receive signalling from the CAN bus 102 and provide received data based on the signalling to a receive output 106 for receipt at a receive input 107 at the CAN controller 101. The receive output 106 and the receive input 107 may comprise integrated circuit pins.

The CAN transceiver 103 comprises a transmitter arrangement 108 configured to transmit signalling on the CAN bus 102 based on said transmit data. The CAN transceiver 103 also comprises a receiver arrangement 111 configured to receive signalling from the CAN bus 102 and provide received data based on the signalling.

The transmitter arrangement 108 comprises at least one transmitter and, in this example comprises two transmitters 109, 110. The at least one transmitter is configured to operate in a first transmission mode or a second transmission mode, wherein in the first transmission mode the transmitter arrangement is configured to transmit said signalling with a first property and wherein in the second transmission mode the transmitter arrangement is configured to transmit said signalling with a second property. The first and second property may comprise one or more property types, such as baud rate (e.g. maximum, minimum or average baud rate), voltage level scheme, encoding scheme or other. However, for ease of explanation herein, the first and second property may comprise baud rate such that the first property comprises a first baud rate and the second property comprises a second baud rate wherein the first baud rate is higher than the second baud rate. The use of a higher baud rate may improve the rate with which data can be transmitted on the CAN bus. Nevertheless, it will be appreciated that the first and second property could (in any of the example embodiments herein) alternatively be, or additionally be, a voltage level scheme used to represent logic 0 and logic 1 on the CAN bus 102.

Therefore, going forward and as an example only, the first transmission mode will be referred to as the fast transmission mode and the second transmission mode will be referred to as the slow transmission mode.

The receiver arrangement 111 comprises at least one receiver and, in this example comprises two receivers 112, 113. The at least one receiver may be configured to operate in a first receive mode or a second receive mode, wherein in the first receive mode the receiver arrangement 111 is configured to receive signalling from the bus 102 with the first property and in the second receive mode the receiver arrangement 111 is configured to receive signalling from the bus 102 with the second property. As described above, the property may any one or more of baud rate, voltage level scheme, encoding scheme or other.

Therefore, going forward and as an example only, the first receive mode will be referred to as the fast receive mode and the second receive mode will be referred to as the slow receive mode.

As mentioned above and as shown in this example, the transmitter arrangement 108 comprises a first transmitter 109 configured to transmit signalling at said higher baud rate and a second transmitter 110 configured to transmit signalling at a lower baud rate. In one or more examples, the first transmitter 109 is configured to transmit said signalling with a first voltage level scheme to represent logic high and logic low on the CAN bus 102 and the second transmitter 110 is configured to transmit said signalling with a second voltage level scheme to represent logic high and logic low different to the first voltage level scheme. Thus, the first and second transmitters 109, 110 may differ in terms of one or more of the baud rate they are capable of transmitting, the voltage level scheme used for the signalling applied to the CAN bus and a slew rate at which the transmitter can transition between logic high and logic low voltage levels (to provide said signalling with the first property and the second property). Each of the transmitters 109, 110 has two outputs to provide signalling to the two wire CAN bus 102.

It will be appreciated that in one or more examples, the transmitter arrangement 108 may comprise one transmitter and one or more of a change in voltage applied thereto, a bias voltage and the switching in or out of additional circuitry may be used to enable the provision of the fast transmission mode and slow transmission mode by the single transmitter. In other examples, more than two transmitters may be used to provide the fast transmission mode and the slow transmission mode.

As mentioned above and as shown in this example, the receiver arrangement 111 comprises a first receiver 112 configured to receive signalling at said higher baud rate and a second receiver 113 configured to receive signalling at the lower baud rate. In one or more examples, the first receiver 112 is configured to receive said signalling with a first voltage level scheme to determine logic high and logic low of the signalling from the CAN bus 102 and the second receiver 113 is configured to receive said signalling with a second voltage level scheme to determine logic high and logic low from the signalling from the CAN bus 102 different to the first voltage level scheme. Thus, the first and second receivers 112, 113 may differ in terms of one or more of the baud rate they are capable of receiving in terms of distinguishing between symbols on the CAN bus 102 and the voltage level scheme used for the signalling on the CAN bus (to enable the receipt of signalling with the first and second property). Each of the receivers 112, 113 has two inputs to receive signalling from the two wire CAN bus 102 and a single output to provide for onward transmission of the received data to the CAN controller 101 or any other components therebetween.

It will be appreciated that in one or more examples, the receiver arrangement 111 may comprise one receiver and one or more of a change in voltage applied thereto, a bias voltage and the switching in or out of additional circuitry may be used to enable the provision of the fast receive mode and slow receive mode by the single receiver. In other examples, more than two receivers may be used to provide the fast receive mode and slow receiver mode.

The determination of whether it is required for the node 100 to operate in the fast transmission mode rather than the slow transmission mode may be made by the CAN controller 101. However, in one or more examples, it may be necessary to reliably and robustly signal this requirement to the CAN transceiver 103 and in such a way that the transmitter arrangement 108 of the CAN transceiver 103 can reliably and robustly transition between the fast transmission mode and slow transmission mode and vice-versa and, when required, the receiver arrangement 111 can transition between the slow receive mode and fast receive mode and vice-versa.

In the present examples, this "mode" signalling is provided by using a particular encoding scheme on the transmit data that is passed from the CAN controller 101 to the CAN transceiver 103. Thus, for the CAN controller, when the fast transmission or fast receive mode is required, the particular encoding scheme is applied to the transmit data and it may be passed to the CAN transceiver 103 via the transmit output 104 and transmit input 105. Once the particular encoding scheme is detected by the CAN transceiver 103 it can provide the appropriate mode for the time the transmit data is encoded by said encoding scheme. When the particular encoding scheme is not present or a different encoding scheme is used, the CAN transceiver 103 may, such as by default, adopt the other of the slow/fast transmission/receive modes. It will be appreciated that in other examples, the determination of the first line code encoding of the transmit data may signify the use of the slow transmission mode or slow receive mode.

In particular, in this and one or more examples, the transmitter arrangement 108 is configured to operate in the fast transmission mode based on a determination that the transmit data is encoded with a first line code and configured to operate in the slow transmission mode based on a determination that the transmit data is not encoded with the first line code. The transceiver 103 also includes a decoder 114 to remove the "mode signalling" first line encoding of the transmit data. The decoder 114 is configured to decode the first line code of the transmit data and provide the decoded transmit data to the transmitter arrangement 108 to provide for said transmission of the signalling on the CAN bus at least when the transmitter arrangement is in the fast mode (or the slow transmission mode if the encoding is intended to indicate use of the slow transmission mode). Depending on the signalling required on the CAN bus, the decoder and the need to decode the first line code "mode signalling" for the transmitter arrangement may not be necessary in some examples.

In one or more examples, the decoder 114 is coupled to the transmit input 105 by connection 120 to receive the transmit signal and is coupled to the first transmitter 109 to provide its decoded output. More generally, it may be coupled to the transmitter arrangement 108 and configured to provide the decoded transmit data when the transmit data is received in the form encoded by the first line code whereas when the transmit data is received in the form not encoded by the first line code, the decoder 114 does not provide the transmit data to the receiver arrangement (or it does provide it but it is ignored by the receiver arrangement). Thus, the transmitter arrangement 108 may be configured to receive the transmit data that bypasses the decoder when the first line code is not used to encode the transmit data. In this example, the second transmitter 110 receives the transmit data directly from the transmit input 105 by connection 121. The decoder 114 may also provide a clock output representative of the clock used to encode the transmit data with the first line code at output 122. The ability to derive a clock signal may be useful for the transceiver.

In one or more examples, it may be desirable for the CAN transceiver 103 to effectively distinguish between the transmit data that is encoded with the first line code compared to the transmit data when it is not encoded with the first line code. In one or more examples, the first line code comprises a code in which the first line coded transmit data has shorter pulse widths than said transmit data that is not encoded with the first line code. Thus, the first line code may be such that the maximum pulse width possible i.e. the time between edges (of logic high and logic low or two or more other levels) in a stream of transmit data is less (or more) when the transmit data is encoded with the first line code than the minimum (or maximum) pulse width when it is not used. The determination of the pulse width may use minimum pulse width detected, maximum pulse width or average pulse width over a plurality of pulses or the pulse with of one pulse (e.g. high-low-high or low-high-low transition of the signalling, e.g., differential signalling). Thus, the temporal length of the pulse widths of the transmit data compared to a threshold time may provide one way of determining if the first line code is applied to the transmit data or not. It will be appreciated that other determining factors could be used such as number of edges detected in a particular time relative to a threshold or the number of voltage levels used in the encoding among others.

In one or more examples, the first line code comprises a code that uses the phase to encode the transmit data. In one or more examples, the first line code comprises one of Manchester code; Return-to-Zero, RZ, code; and differential Manchester code. In the description that follows the first line code is a phase code and, in particular, Manchester encoding is applied to the transmit data by the CAN controller 101 and detected by the CAN transceiver 103. In one or more examples, phase encoding may inherently reduce pulse widths making the application of the phase encoding detectable by the CAN transceiver by measuring pulse width time.

Thus, in one or more examples, for the period of time in which the transmit data is encoded with the first line code, the transceiver operates in the fast transmission mode excluding any mode-change-time required to detect the presence or absence of first line code encoded transmit data, and, for the period of time in which the transmit data is not encoded with the first line code, the transceiver operates in the slow transmission mode excluding any mode-change-time required to detect the presence or absence of the first line code encoded transmit data. The use of different encoding of the transmit data to signal the desired transmission mode for the transceiver may provide a reliable signalling method because the signalling of the desired mode is continuously present rather than being signalled in a one-off manner by way of a "mode change message".

It will be appreciated that in one or more examples, the use of the phase encoding may be used to indicate use of the slow transmission mode rather than the fast transmission mode. Provided that the encoding or non-encoding of the transmit data using a particular code can be distinguished by the CAN transceiver 103 it can be used to signify the transmission mode and/or receive mode that should be adopted.

In one or more examples, the CAN transceiver 103 comprises a mode detector 115 configured to determine the presence or absence of the first line code encoding of the transmit data and provide a mode-switch signal to the transmitter arrangement 108 to select either the fast transmission mode or the slow transmission mode. The mode detector may be coupled to receive the transmit data from the transmit input 105, such as by connection 119. The mode detector 115 may therefore be continually checking for the presence or absence of the first line code encoding to control the mode-switch-signal. The mode-switch signal may comprise a plurality of signals that may be provided to the relevant components in the CAN transceiver 103. In this example and any other example, the mode switch signal may comprise an enable/disable signal provided to the first transmitter 109 by connection 116. Further, the mode switch signal may comprise an enable/disable signal provided to the second transmitter 110 by connection 117. Thus, in the fast transmission mode, the first transmitter 109 may be enabled and the second transmitter 110 may be disabled. Likewise, in the slow transmission mode, the first transmitter 109 may be disabled and the second transmitter 110 may be enabled.

A similar enabling and disabling of the first receiver 112 and the second receiver 113 may be provided by the mode detector 115. However, in this example, the enable/disable signal applied to the second transmitter 110 is used to control a switch 118. The switch 118 is configured to select which one of the first and second receivers 112, 113 is connected to the receive output 106 at any one time. Thus, each of the first and second receivers 112, 113 will receive the signalling from the CAN bus 102 but only one will be able to provide received data based on said signalling to the receive output 106 for receipt by the CAN controller 101. In one or more examples, when the mode detector 115 enables the second transmitter 110, the switch 118 connects the second receiver 113 to the receive output 106 whereas when the mode detector disables the second transmitter 110, the switch 118 connects the first receiver 112 to the receive output 106. It will be appreciated that, and as will be described later, the mode detector 115 may be configured to enable one or none of the first and second transmitters. In one or more examples, the mode detector may be configured to enable only one of the receivers 112, 113 or, in other examples, none of the receivers depending on the requirements of the CAN controller 101.

The mode detector 115 may have a default configuration in which the slow transmission mode and/or slow receive mode is selected and the fast transmission mode and fast receive mode is not selected. Thus, use of a slow transmission mode and slow receive mode may be the default at start-up and/or on occurrence of an error and/or on occurrence of a reset event.

Turning now to the example physical configuration of the CAN controller 101, the CAN controller 101 may comprise a controller module 123 configured to output the transmit data at 124. The transmit data may be provided to the transmit output 104 for the CAN transceiver (in this example via switch 125). An encoder 126 also receives the transmit data output by the controller module 123 and encodes it using the first line code. The encoder 126 may receive a clock input at 127 for use in the encoding. The encoded transmit data is output at 128 to a second switched terminal of the switch 125.

The CAN controller 101 comprises a mode selector configured to provide a controller mode signal, e.g. fast mode signal, that instructs the CAN transceiver to operate in a fast transmission mode rather than a slow transmission mode. As discussed above in relation to the operation of the CAN transceiver 103, the CAN controller is configured such that the controller mode signal provides for the encoding of the transmit data with a first line code by the encoder 126 which, in turn, instructs the CAN transceiver 103 to operate in the fast transmission mode (in this example). The controller 101 is configured such that the absence of the controller mode signal or the provision of a different controller mode signal provides for the non-encoding of the transmit data with the first line code, which, in turn, instructs the CAN transceiver 103 to operate in the slow transmission mode (in this example). Thus, the mode selector in this example is provided by the controller module 123 being configured to output a controller mode signal at 130 to control the position of the switch 125. The switch 125 has two positions; one in which the transmit data as output by the controller module is coupled to the transmit output 104 without being encoded by the first line code and a second in which the transmit data as output by the encoder 126 is coupled to the transmit output 104. Thus, the controller mode signal of the mode selector determines whether the encoded transmit data, encoded by the encoder 126, is provided to the CAN transceiver or whether the transmit data that bypasses the encoder 126 is provided to the CAN transceiver. It will be appreciated that the transmit data output by the controller module 123 takes an encoded form, which may be non-return-to-zero, NRZ, encoded or other form. Thus, the transmit data not encoded by the encoder 126 may comprise NRZ encoded transmit data and the transmit data encoded by the encoder 126 may comprise NRZ encoded transmit data that is further encoded with a phase code, such as Manchester encoding. The decoder 114 of the CAN transceiver 103 may therefore remove the phase code thereby returning the transmit data to the NRZ encoded form. The controller module 101 also receives the received data from the receive input 107.

Figure 2:
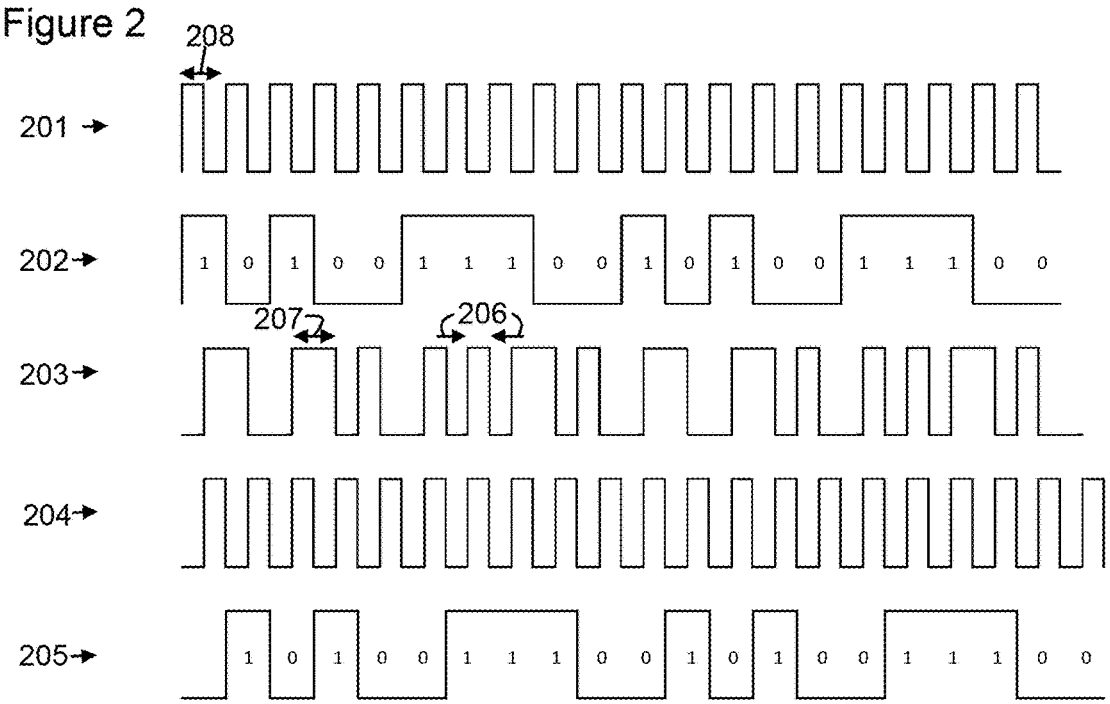
FIG. 2 shows an example first line code comprising Manchester encoding.

Turning to example FIG. 2, an example first line code is shown comprising Manchester encoding. The encoding clock is shown at 201 which is provided to the encoder 126 at input 127. The transmit data from output 124 is shown at 202. The transmit data shown at 202 may comprise transmit data that is intended to be transmitted on the CAN bus by the CAN transceiver in the fast transmission mode. The transmit data encoded by the Manchester encoding is shown at 203. Thus, a logic 1 in the transmit data is encoded as a rising edge in the middle of the clock period. A logic 0 in the transmit data is encoded as a falling edge in the middle of the clock period. No data is encoded at the edges located between clock periods as these edges are used to ensure the encoder is in the correct state to represent the next logic value with an appropriate rising or falling edge.

The decoder 114 of the CAN transceiver 103 may be configured to extract the clock signal from the encoded transmit data as shown at 204. The decoder 114 uses the rising and falling edges to decode the transmit data and provides the output as shown at 205.

The properties of the Manchester code is that the pulse width has a minimum length 206 of half the clock period and a maximum length 207 of a clock period 208.

The clock signal at 127 for the encoder 126 should be synchronous with the clock signal of the controller module 123 that generates the data stream that forms the transmit data. Thus, the phase encoding will be applied in synchrony with the logic states of the data stream of transmit data. In one or more examples, the clock signal 127 has the same or faster clock frequency compared to the symbol frequency of the data stream of transmit data.

For example, to support 10 Mbps during the transmission of the transmit data the clock frequency at 127 for the encoder 126 may be 10 MHz (10 Mbps means a bit time of 100 ns which requires a clock period time of 100 ns and therefore a clock frequency of 10 MHz). Thus, at 10 Mbps with a repeating data pattern of 1010 . . . , the Manchester coding provides a transmit signal having a base band frequency of 5 Mhz, hence the use of a twice as fast phase encode frequency clock. The clock for a typical CAN controller 101 may already be higher than 10 MHz for supporting 10 Mbps, and the clock frequency may be 120 MHz for example. This means the clock at 127 for the encoder 126 can be easy derived/divided from the clock typically used by the controller module 123. It will be appreciated that the absolute frequencies mentioned are just practical examples and the concept is functional with other frequencies.

Figure 3:
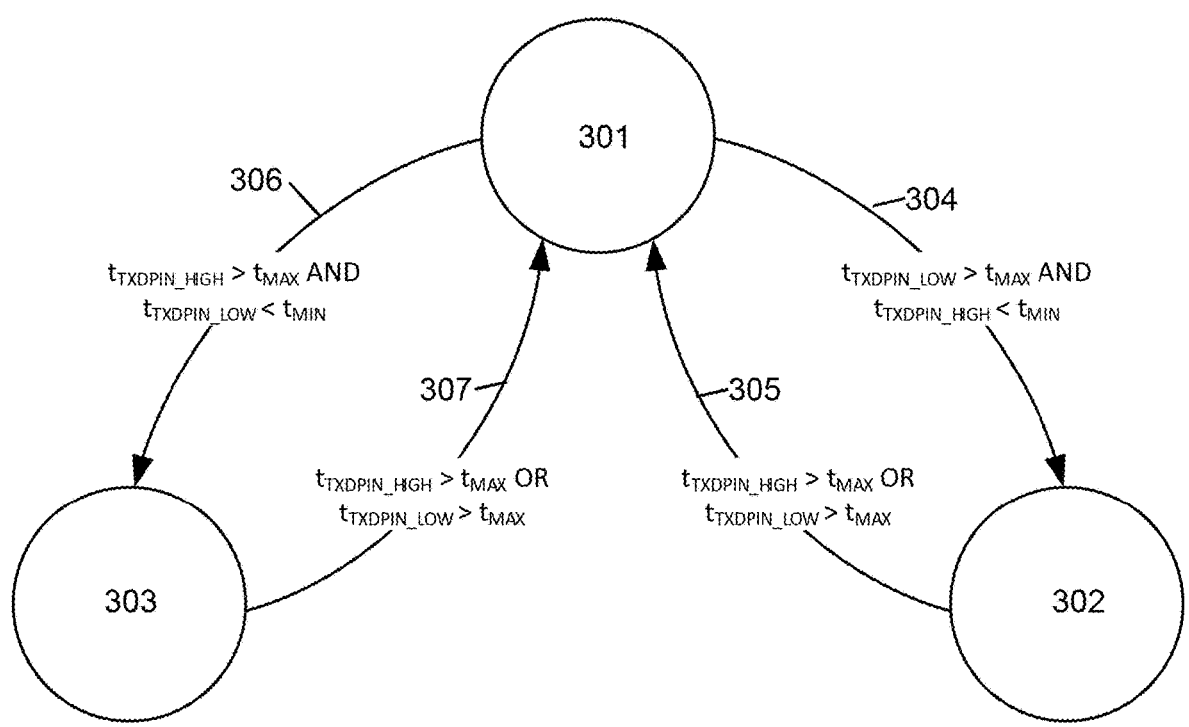
FIG. 3 shows an example state diagram illustrating the modes of the CAN transceiver and therefore the effect of the controller mode signal on the CAN transceiver.

Example FIG. 3 shows an example mode diagram of the CAN transceiver 103 and it will be described how the modes of the CAN transceiver 103 control the fast and slow transmission modes of the transmitter arrangement 108 and the fast and slow receive modes of the receive arrangement 111.

In summary, in these examples, the CAN transceiver 103 is configured to determine whether or not the transmit data is encoded by the first line code by measuring the pulse width of the transmit data and, if the pulse width is below a threshold time, the transmitter arrangement is configured operate in the fast transmission mode and, if the pulse width is above the threshold time, the transmitter arrangement is configured operate in the slow transmission mode.

Thus, the CAN transceiver 103 has a slow mode 301 in which the transmitter arrangement 108 is placed in or defaults to the slow transmission mode. In the slow mode 301 the receiver arrangement 111 may also be placed in or default to the slow receive mode. The CAN transceiver 103 may also have a fast-TX mode 302 in which the transmitter arrangement is placed in the fast transmission mode. In the fast-TX mode 302 the receiver arrangement may also be placed in or default to the fast receive mode. The CAN transceiver 103 may also have a Fast-RX mode in which the node 100 does not transmit but is configured to receive signalling at the higher baud rate from the CAN bus 102. In the fast-RX mode, the transmitter arrangement 108 may be disabled. Thus, both the first transmitter 109 and the second transmitter 110 may be provided with a mode signal that disables them or the disabled state may be one or both of their default states and no mode signal may be provided to them. In the fast-RX mode, the receiver arrangement 111 is placed in the fast receive mode.

We will now describe how the mode detector 115 may make the determination of which mode the transmitter arrangement 108 and the receiver arrangement 111 should be in, or, which mode the CAN transceiver 103 should be in which will then define which of the fast and slow modes of the transmitter arrangement 108 and the receiver arrangement 111 is used.

In one or more examples, the mode detector 115 is configured to determine a logic-low time and a logic-high time (shown as $t_{TXDPIN\_HIGH}$ and $t_{TXDPIN\_LOW}$ respectively in FIG. 3). The logic-low time comprises the length of time the transmit data was logic low since the last logic high and the logic-high-time comprises the length of time the transmit data was logic high since the last logic low. Thus, the mode detector may include a timer or other means to measure the length of time the transmit signal is or was logic low in the most recent continuous logic low state and to measure the length of time the transmit signal is or was logic high in the most recent continuous logic high state, assuming a two state signal. In other examples, further logic times may be measured.

The mode detector 115 is configured to, based on the logic-low-time being longer than a first time threshold (shown as $t_{MAX}$ in FIG. 3) and the logic-high-time being shorter than a second time threshold (shown as $t_{MIN}$ in FIG. 3), provide the mode-switch signal to the transmitter arrangement to select the fast transmission mode. This may be provided by the CAN transceiver 103 transitioning by transition 304 from slow mode 301 to Fast-TX mode 302.

The mode detector 115 may be further configured to, based on the logic-low-time being longer than the first time threshold, $t_{MAX}$, and/or the logic-high-time being longer than the first time threshold, $t_{MAX}$, provide the mode-switch signal to the transmitter arrangement to select the slow transmission mode. This may be provided by the CAN transceiver 103 transitioning by transition 305 from the Fast-TX mode 302 to the slow mode 301.

The second time threshold $t_{MIN}$ may be less than that first time threshold $t_{MAX}$. In one or more examples, the first time threshold is based on the longest pulse width possible that is representative of a single logic value in the transmit data when the first line code is used. In particular, it may comprise the longest pulse width possible that is representative of a single logic value in the transmit data using the first line code plus a tolerance time $t_{TOL}$. Considering the Manchester encoded transmit signal of the example, the longest pulse width is provided based on a single logic value within transmit data comprising "010101 . . . " and therefore for 10 Mbps transmit data, the longest pulse width is 100 ns (and the shortest is 50 ns). The first time threshold $t_{MAX}$ may therefore comprise 100 ns plus a tolerance time to account for any unintended variation in timings. The tolerance in this example may comprise 10% and therefore 10 ns, although other tolerances may be used. Accordingly, the first time threshold $t_{MAX}$ may therefore comprise 110 ns in this example.

In one or more examples, the second time threshold is based on the longest pulse width possible that is representative of a single logic value in the transmit data when the first line code is used. In particular, it may comprise the longest pulse width possible that is representative of a single logic value in the transmit data using the first line code minus a tolerance time $t_{TOL}$. Considering the Manchester encoded transmit signal of the example, the longest pulse width is provided based on a single logic value within transmit data comprising "010101 . . . " and therefore for 10 Mbps transmit data, the longest pulse width is 100 ns (and the shortest is 50 ns). The second time threshold $t_{MIN}$ may therefore comprise 100 ns minus a tolerance time to account for any unintended variation in timings. The tolerance in this example may comprise 10% and therefore 10 ns, although other tolerances may be used. Accordingly, the second time threshold $t_{MIN}$ may therefore comprise 90 ns.

It will be appreciated that the tolerance times $t_{TOL}$ used for determination of the first and second time thresholds $t_{MIN}$ and $t_{MAX}$ may or may not be the same tolerance time $t_{TOL}$. Further the tolerance may be any value between 0% and 50% or more of the longest pulse width time. In this example, the time thresholds are chosen based on the shortest and/or longest pulse widths when the transmit data is encoded and/or the shortest and/or longest pulse widths when the transmit data is not encoded with the first line code. It will be appreciated that by longest and shortest pulse widths, as above, we refer to the time between a first transition between logic high and logic low (in either direction) and a second transition between logic high and logic low, in the opposite direction to the first transition, wherein the time between the first and second transitions encodes a single logic value.

In Fast-TX mode 302, the receiver arrangement 111 may be placed in a fast receive state corresponding to the fast transmission state. Given in the example of FIG. 2, that the mode-switch signal used to enable and disable the second transmitter is also configured to control switch 118, a corresponding receive mode may be provided without any additional mode-switch signals.

We now consider the example transitions between the slow mode 301 and the fast-RX mode 303 of FIG. 3. Here, the mode detector 115 may be configured to provide the mode-switch signal to the receiver arrangement 111 to select either a fast receive mode in which the receiver arrangement is configured to receive signalling at said higher baud rate, and a slow receive mode in which the receiver arrangement 111 is configured to receive signalling at a lower baud rate, lower than the higher baud rate. In the fast receive mode the mode-switch signal to the transmitter arrangement 108 may be configured to disable the transmitter arrangement 108, i.e. both the first and second transmitter.

As explained above, the mode detector is configured to determine the logic-low-time and the logic-high-time. The mode detector 115 is configured to, based on the logic-high-time $t_{TXDPIN\_HIGH}$ being longer than the first time threshold $t_{MAX}$ and the logic-low-time $t_{TXDPIN\_LOW}$ being less than the second time threshold $t_{MIN}$, provide the mode-switch signal to the receiver arrangement 111 to select the fast receive mode and, optionally, provide the mode-switch signal to the transmitter arrangement to disable the transmitter arrangement. This may be provided by the CAN transceiver 103 transitioning by transition 306 from slow mode 301 to Fast-RX mode 303.

Further, the mode detector 115 is configured to, based on the logic-low-time $t_{TXDPIN\_LOW}$ being longer than the first time threshold $t_{MAX}$ and/or the logic-high-time $t_{TXDPIN\_HIGH}$ being longer than the first time threshold $t_{MAX}$, provide the mode-switch signal to the transmitter arrangement 108 to select the slow transmission mode and, optionally, the slow receive mode. This may be provided by the CAN transceiver 103 transitioning by transition 307 from Fast-RX mode 303 to the slow mode 301.

It will be appreciated that the slow mode 301 may be a default mode and the absence of the conditions required for transitions 306 and 304 may result in the CAN transceiver transitioning back to the slow mode 301 via transitions 305 and 307.

In summary, based on the comparison of the logic-low-time and the logic-high-time, the mode-switch signal(s) provided by the mode detector 115 is configured to, in the fast transmission mode or fast-TX mode 302, enable the first transmitter 109 and disable the second transmitter 110, and, in the slow transmission mode, disable the first transmitter 109 and enable the second transmitter 110.

Further and in summary, based on the comparison of the logic-low-time and the logic-high-time, the mode-switch signal(s) provided by the mode detector 115 is configured to, in the fast transmission mode, enable the first receiver 112 and disable the second receiver 113 in the provision of the received data to the receive output, and, in the slow transmission mode, enable the second receiver 113 and disable the first receiver 112 in the provision of the received data to the receive output.

Further and in summary, based on the comparison of the logic-low-time and the logic-high-time, the mode-switch signal(s) provided by the mode detector 115 is configured to, in the fast receive mode or fast-RX mode 303, enable the first receiver 112 and disable the second receiver 113 in the provision of the received data to the receive output (by the position of switch 118 or otherwise), and, in the slow receive mode, enable the second receiver 113 and disable the first receiver in the provision of the received data to the receive output (by the position of switch 118 or otherwise).

In one or more examples, the default state for the CAN transceiver after power-on is the slow mode 301. The determination of whether a CAN controller 101 and CAN transceiver 103 is in a transmitting state or a receiving state is determined by the CAN protocol during an arbitration phase. The transmit data may be driven to a particular value at a particular time to indicate the node 100 "won" the arbitration phase and therefore has the right to transmit and, if the node "lost" the arbitration phase, the transmit data may be driven to an alternate particular value at the particular time. This property may be used by the mode detector 115 to determine whether to transition to the Fast-TX mode 302 or the Fast-RX mode 303.

If the logic-high-time was longer compared to the first time threshold then this is detected as recessive, indicative of arbitration being lost. If the logic-low-time was shorter compared to the second time threshold then this is detected as meaning the transmit data is being phase encoded (encoded with the first line code). This prompts the state change from slow mode 301 to fast-RX mode 303.

If the logic-low-time was longer compared to the first time threshold then this is detected as dominant, indicative of the arbitration being won. If the logic-high-time was shorter compared to the second time threshold then this is detected as meaning the transmit data is being phase encoded (encoded with the first line code). This prompts the state change from slow mode 301 to fast-TX mode 302.

If the logic-low-time or the logic-high-time is longer compared to the first time threshold $t_{MAX}$ then this is indicative of the transmit data no longer being phase encoded (i.e. encoded with the first line code). This prompts the state change to slow mode 301 from either the fast-RX mode 303 or the fast-TX mode 302.

The decoder 114 in the CAN transceiver 103 will derive a clock from the Manchester encoded transmit data. This clock output will have the same accuracy as the clock used inside the controller module 123 and encoder 126 to encode the transmit data. While this extracted clock is optional for this disclosure, it can be beneficial when an accurate clock is required in the CAN transceiver 103 for other functionality not disclosed herein.

We now consider the timing diagrams of FIGS. 4 to 7. The first line 401 shows the output from the CAN controller module 101 at output 124 when the transmit data is generated prior to any first line code encoding that may or may not be applied. The second line 402 shows controller mode signal output at 130 that controls whether the CAN transceiver receives the example Manchester encoded transmit data or the non-Manchester encoded transmit data. The third line 403 shows the transmit data as received by the CAN transceiver 103 and therefore the first line code encoding may or may not be applied. The fourth line 404 shows a component part of the mode-switch signals and in particular the enable/disable signal applied to the first (fast) transmitter 109. The fifth line 405 shows a component part of the mode-switch signals and in particular the enable/disable signal applied to the second (slow) transmitter 110. The sixth line 406 shows the decoded transmit data received by the first (fast) transmitter 109 as output by decoder 114. The seventh line 407 shows the differential signal applied to the CAN bus 102 comprising a CANH signal applied to one of the two wires minus the a CANL signal applied to the other of the two wires as will be familiar to those skilled in the art. The eighth line 408 shows the received data provided by the receiver arrangement 111 at the receive output 106 (and therefore received by the CAN controller 101).

To aid explanation, the diagram of FIG. 4 shows the state of the various signals during the end of an arbitration phase 409 of the CAN protocol which is designated by a transition bit 410. The arbitration phase comprises a part of the protocol where the node entitled to transmit for the upcoming transmission period is determined. After the transition bit 410 there is a data phase 411 in which the current node 100 transmits at a higher baud rate. The end of the data phase 411 is designated by a further transition bit 412 followed by a acknowledge phase 413 (which may take the same form as the arbitration phase 409). Such phases will be understood by those skilled in the art of the CAN protocol. The arbitration and acknowledge phases and the transition bits are performed at a slower baud rate unless otherwise specified.

In this example timing diagram, the slower baud-rate used in arbitration is 1 Mbps (although other, e.g. slower, rates may be used as will be understood by those skilled in the art of the CAN protocol) and the data-phase baud-rate is 10 Mbps and the first line code, Manchester code clock is 10 MHz. This means the slow data bit 424 and the transition bit 425 is 1 μs long. A fast data bit 414 is 100 ns long and a phase encoded bit 415 of the transmit data at line 403 can be minimum 50 ns and maximum 100 ns long depending of the logic level sequence of the transmit data in line 401. As in the example described above the first time threshold $t_{MAX}$=110 ns and the second time threshold $t_{MIN}$=90 ns.

The CAN controller module 123 and the CAN transceiver 103 start in slow mode. The transmit data of the controller module 123 is directed to the transmit output 104 via the switch 125 bypassing the encoder 126 when the controller mode signal at 130 is logical 0 as shown by the line 402 when it is logical 0 and the similarity between lines 401 and 403 during this time. The mode detector 115 in the transceiver 103 is in the slow mode and therefore the second, slow transmitter 110 is enabled as shown in line 405 being logical 1, which represents the signal at 117. The first, fast transmitter 109 is disabled in the slow mode and the line 404, representing the mode-switch signal output at 116 is logical 0. The output of the second, slow receiver 113 is directed to the receive output 106 via the switch 118 because the component of the mode switch signal at 117 is logical 1. During the arbitration phase 409 and the beginning of the transition bit 410 the node may be operating as a traditional CAN node.

As mentioned above, after the arbitration phase 409 and before the data-phase 411 a dedicated transition bit 410 may be defined in the CAN protocol frame and it is during this time the mode change is executed to switch from the slow mode to the fast-TX or fast-RX mode that uses the higher baud rate. The switching to the higher baud rate means that the CAN controller 101 can now output transmit data at a higher rate and the CAN transceiver needs to switch to the appropriate mode to apply this higher rate transmit data to the CAN bus 102. At time 416, the CAN controller module 123 sets the mode signal at 130 to logical 1 as shown in line 402 and the switch 125 therefore directs the output of the encoder 126 to the transmit output 104 and therefore the transmit input 105. Since the transition bit is a logical 0 (dominant) in line 401 at this time, the Manchester encoded transmit data from the encoder 126 becomes a pulse train with a pulse width of 50 ns (determined by the 10 MHz phase encoder clock), as shown in line 403 beginning at time 416. In this example, the controller module 123 is configured to begin the change to the fast mode at time 416 because it in the middle of the transition bit 410, meaning the transmit data at 105 as shown in line 403 was already logical 0 for 500 ns (up until time 416). The first high pulse 418 on the line 403 is 50 ns and this means the conditions are valid for a mode change from slow mode 301 to fast-TX 302 (see transition 304 in FIG. 3) in the CAN transceiver 103. It will be appreciated that the transition may not be at the middle but other parts of the transition bit. In one or more examples, it may be advantageous for the module 123 to switch to the fast mode such that at least two pulses or at least four edges of encoded data are provided to the CAN transceiver 103 before the end of the transition bit 410. As will be explained below, this may be useful to enable the decoder 114 to lock on to the clock used to encode the transmit data by encoder 126. It will be appreciated that in other examples, such a clock lock-on process may not be required.

Before the phase decoder 114 in the CAN transceiver 103 can decode the encoded transmit data it needs to derive the clock from the transmit data stream and in this example, this happens on the "preamble" (comprising toggling data at clock rate) between time 416 and 417. At time 417 the decoder 114 is locked on the clock and the transmit data output by the decoder 114 is now valid. The mode decoder 115 provides the mode switch signals as shown in lines 404 and 405 to enable the first, fast transmitter 109 and disable the second, slow transmitter 110. The use of the first transmitter means the CAN bus 102 changes from using "dominant" and "recessive" CAN protocol voltage levels to a second voltage level scheme. Thus, prior to the data phase, the voltage level scheme shown on the CAN bus in line 407 is between 0 and 2 Volts, whereas when the first fast transmitter 109 is driving the CAN bus, the voltage level scheme comprises between −1 Volts and +1 Volts. Other voltage level schemes may be used. The use of the fast transmission mode and the second voltage scheme may be considered as an extension to the CAN protocol. The mode switch signals also connect the first, fast receiver 112 to the receive output via the switch 118. The CAN transceiver 103 is now in fast-TX mode 302 with the transmitter arrangement 108 in fast transmission mode and the receiver arrangement 111 in fast receive mode.

The total length of the preamble (starting halfway through the transition bit 410 between times 416 and 417) is in this example half of the transition bit (500 ns) resulting in 10 edge transitions. This may be very robust and provide enough time for the decoder 114 to derive a clock from the transmit data and provide enough short (encoded with the first line code pulses) to be detected by the mode decoder 115. It will be appreciated that even if the mode detector 115 misses the timing of one or two of the short 50 ns pulses between time 416 and time 417, this will only result in a small delay for the mode detector 115.

Between time 416 and 417 the second, slow transmitter 110 is still enabled and tries to follow the short pulses of 50 ns in the encoded transmit data. Typically, the slow transmitter 110 was not designed to operate that fast and the output on the CAN bus cannot be predicted also resulting in unknown data 420 being received by the controller 101. However, this may not a problem since all the controllers 101 or controller modules 123 are typically synchronised on the CAN network they can be configured to ignore received data during the transition bit 410. Thus, the controller 101 may be configured to ignore at least variations in the received data during a transition bit 425.

During the data phase 411, the higher baud rate transmit data output at 124 is encoded by the encoder 126 and the encoded transmit data is passed to the CAN transceiver 103. The encoding is detected as present by the mode detector 115 and thus the first, fast transmitter 109 is maintained as enabled and can therefore transmit signalling representative of the transmit data, as decoded by decoder 114, on the CAN bus 102

At the end of the data-phase 411 there is also a dedicated transition bit 426 during time 412. It will be appreciated that the transition bit, in any of the timing diagrams, may comprise multiple bits in other examples. In this first timing diagram of FIG. 4, the further transition bit 426 during time 412 is defined as a logical 0 (dominant) of 1 µs i.e. the slower baud rate bit time. At time 421 (in this example in the middle of the further transition bit at time 412 in line 401) the CAN controller 101 or controller module 123 may affect the switch back to slow mode 301. Accordingly, the mode switch signal at 130 and shown in line 402 becomes logical 0, resulting in the unencoded transmit data from 124 being directed to the transmit output 104 by the switch 125. The unencoded transmit data with the control module 123 providing a transmit signal at the slower baud rate is constant low for longer than the first time threshold, 110 ns, and therefore the mode controller 115 will detect that the conditions are valid for a mode change to the slow mode 301 by transition 305. The mode decoder provides the mode switch signal to logical 0 for the first transmitter 109 as shown in line 404 at time 422 and the mode switch signal to logical 1 for the second, slow transmitter 110 as shown in line 405 at time 422. This results in the second transmitter 110 being enabled while the first, fast, transmitter 109 is disabled. The use of the slow transmitter means that the voltage level scheme applied to the CAN bus 102 changes from back to the first voltage level scheme that operated between 0 and 2 Volts ("dominant" and "recessive" CAN protocol levels) rather than −1 Volts and +1 Volts at time 422. The CAN transceiver 103 is now in the slow mode 301.

During time 421 to 422 the transmit data for the decoder 114 becomes static (no edges anymore) which is an invalid Manchester code and cannot be decoded. The decoder 114 may therefore maintain the last valid logic level 0.

Turning to the example timing diagram of FIG. 5, the timing diagram is identical to that of FIG. 4 except that the further transition bit 426 shown in line 401 at time period 412 is logic 1, i.e. recessive according to the CAN protocol.

As will be recalled from the mode diagram of FIG. 3, the mode detector 115 is configured to return the CAN transceiver 103 to the slow mode 301 if either the logic-high-time or the logic low time is longer than the first time threshold. Thus, the presence of the low baud rate transition bit 426, whether it is logic high or logic low, with the non-encoded transmit data being provided to the CAN transceiver 103 is detected by the mode detector 115.

Figure 6:
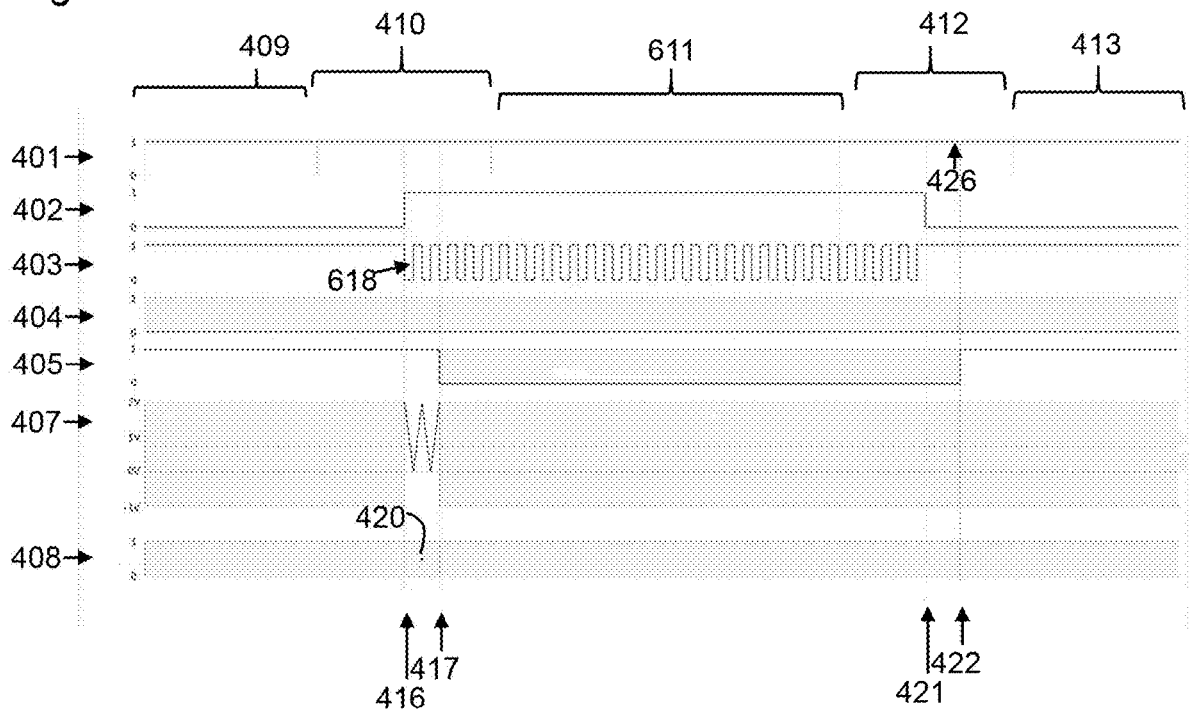
FIG. 6 shows a first example timing diagram illustrating a transition from a second, slow, receive mode to a first, fast, receive mode and back to the second, slow, mode.

Turning to the example timing diagram of FIG. 6, an example transition between the CAN transceiver 103 slow mode 301 and the fast-RX mode 303 is shown. The timing diagram is substantially the same as that shown in FIGS. 4 and 5 in terms of the signal values that are presented except the line 406 is not provided because the first transmitter is disabled during the fast-RX mode 303. The same reference numerals to designate what the lines 401-405, 407, 408 show are used. The same reference numerals are used to show the periods of time to designate the arbitration phase 409, the transition bit 410, the further transition bit 412 and the slow mode 413. The period between the transition bits 410 and 412 is shown as the receive data phase 611.

The CAN controller module 123 and the CAN transceiver 103 start in slow mode. The transmit data of the controller module 123 is directed to the transmit output 104 via the switch 125 bypassing the encoder 126 when the mode signal at 130 is logical 0 as shown by the line 402 and the similarity between lines 401 and 403 during this time, until time 416. The mode detector 115 in the transceiver 103 is in the slow mode and therefore the second, slow transmitter 110 is enabled as shown in line 405, which represents the signal at 117. The first, fast transmitter 109 is disabled in the slow mode 301 and therefore the line 404, representing the mode-switch signal output at 116 is logical 0. The output of the second, slow receiver 113 is directed to the receive output 106 via the switch 118 because the component of the mode switch signal at 117 is logical 1. During the arbitration phase 409 and the beginning of the transition bit 410 the node may be operating as a traditional CAN node.

As mentioned above, after the arbitration phase 409 and before the receive data phase 611 a dedicated transition bit 410 may be defined in the CAN protocol frame and it is during this time the mode change is executed to switch the receiver arrangement to receive the higher baud rate signalling on the CAN bus 102. At time 416 the CAN controller module 123 sets the controller mode signal at 130 to logical 1 as shown in line 402 and the switch 125 therefore directs the output of the encoder 126 to the transmit output 104 and therefore the transmit input 105. Since the transition bit is a logical 1 (recessive) in line 401 at this time, the Manchester encoded transmit data from the encoder 126 becomes a pulse train with a pulse width of 50 ns (determined by the 10 MHz phase encoder clock), as shown in line 403 beginning at time 416. In this example, the controller module 123 is configured to begin the change to the fast mode at time 416 because it is in the middle of the transition bit 410, meaning the transmit data at 105 as shown in line 403 was already logical 1 for 500 ns (up until time 416). The first low pulse 618 on the line 403 is 50 ns and this means the conditions are valid for a mode change from slow mode 301 to fast-RX mode 303 (see transition 306 in FIG. 3) in the CAN transceiver 103. It will be appreciated that the transition may not be at the middle but other parts of the transition bit.

The mode decoder 115 provides the mode control signals as shown in lines 404 and 405 to disable the first, fast transmitter 109 (which was already disabled) and disable the second, slow transmitter 110. The mode switch signals also connect the first, fast receiver 112 to the receive output 106 via the switch 118. The CAN transceiver 103 is now in fast-RX mode 303 with the transmitter arrangement 108 disabled and the receiver arrangement 111 in fast receive mode.

Between time 416 and 417 the second, slow transmitter 110 is still enabled and tries to follow the short pulses of 50 ns in the encoded transmit data. Typically, the slow transmitter 110 was not designed to operate that fast and the output on the CAN bus cannot be predicted also resulting in unknown data 420 being received by the controller 101. However, this may not a problem since all the controller 101 or controller module 123 in the CAN network are typically synchronised and can be configured to ignore received data during the transition bit 410.

During the receive data phase 611, the higher baud rate signalling from the CAN bus 102 is received by the fast receive 112 and passed to the CAN controller 101.

At the end of the receive data-phase 611 there is also a dedicated transition bit 426. In this timing diagram of FIG. 6, the further transition bit 426 of line 410 during time 412 is defined as a logical 1 (recessive) of 1 μs i.e. the slower baud rate bit time. At time 421 (in this example in the middle of the further transition bit at time 412 in line 401) the CAN controller 101 or controller module 123 may affect the switch back to slow mode. Accordingly, the mode switch signal at 130 and shown in line 402 becomes logical 0, resulting in the unencoded transmit data from 124 being directed to the transmit output 104 by the switch 125. The unencoded transmit data with the control module 123 providing a transmit signal at the slower baud rate is constant high for longer than the first time threshold, 110 ns, and therefore the mode controller 115 will detect that the conditions are valid for a mode change to the slow mode 301 (see transition 307 in FIG. 3). The mode decoder 115 provides the mode switch signal to logical 0 for the first transmitter (maintained disabled) as shown in line 404 at time 422 and the mode switch signal to logical 1 for the second, slow transmitter (now enabled) as shown in line 405 at time 422. This results in the second transmitter 110 being enabled while the first, fast, transmitter 109 is (maintained) disabled. The slow receive mode is enabled.

Figure 7:
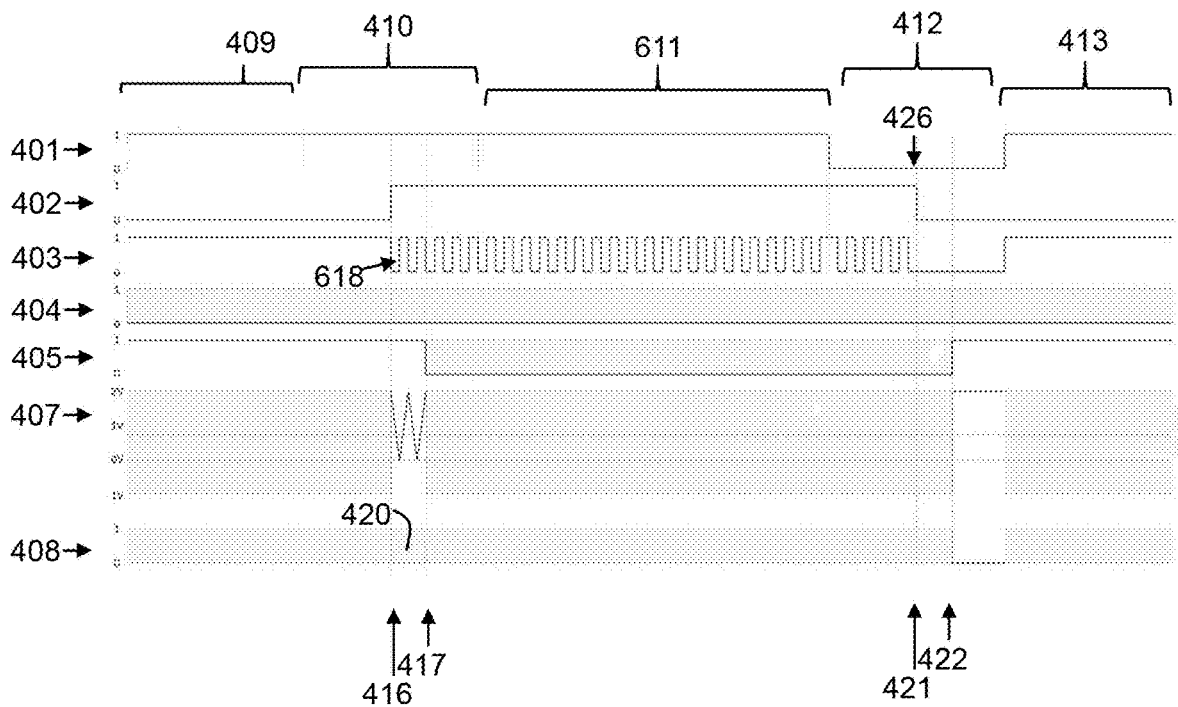
FIG. 7 shows a second example timing diagram illustrating a transition from a second, slow, mode to a first, fast, receive mode and back to the slow mode.

Turning to the example timing diagram of FIG. 7, the timing diagram is identical to that of FIG. 6 except that the further transition bit 426 shown in line 401 at time period 412 is logic 0, i.e. dominant according to the CAN protocol.

As will be recalled from the mode diagram of FIG. 3, the mode detector 115 is configured to return the CAN transceiver 103 to the slow mode 301 if either the logic-high-time or the logic low time is longer than the first time threshold. Thus, the presence of the low baud rate transition bit 426, whether it is logic high or logic low, with the non-encoded transmit data being provided to the CAN transceiver 103 is detected by the mode detector 115.

Accordingly, optionally using a logic low or logic high signal to transition back to the slow mode, there may be an optional active dominant signal on the bus 407 for a certain time, which might be useful system wide for the (re-)synchronization of the nodes. Thus, both logic high and logic low on line 403 are possible and optionally the CAN bus may be driven and/or the signal is filtered out by the transceiver.

Figure 8:
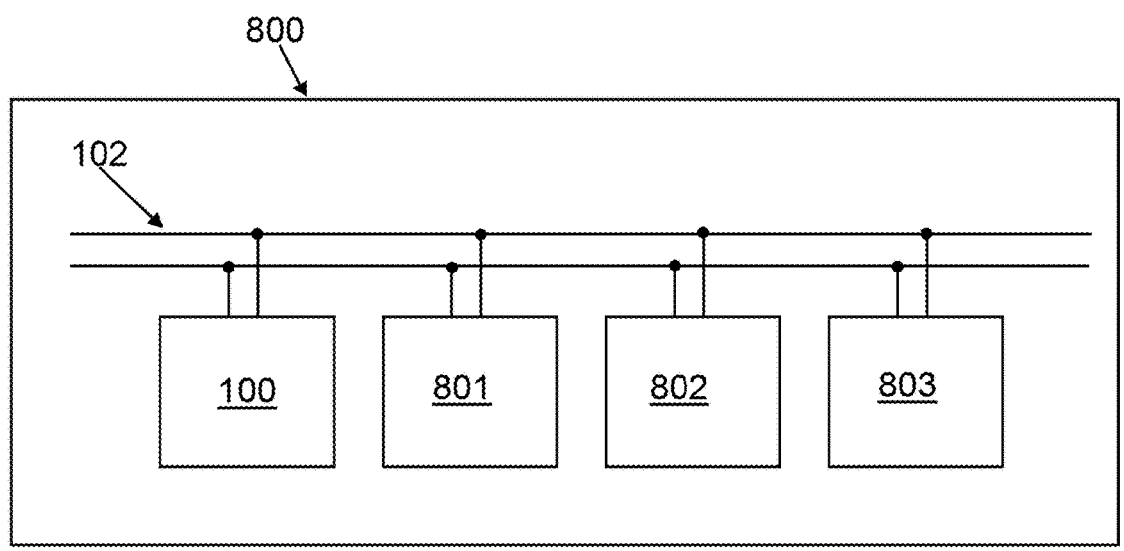
FIG. 8 shows an example CAN network.

FIG. 8 shows an example apparatus that includes a Controller Area Network, CAN, comprising a plurality of nodes including node 100 and other nodes 801, 802, 803. The network apparatus may be an automobile or other apparatus and the CAN network may provide for communication between systems of the automobile or other apparatus.

Figure 9:
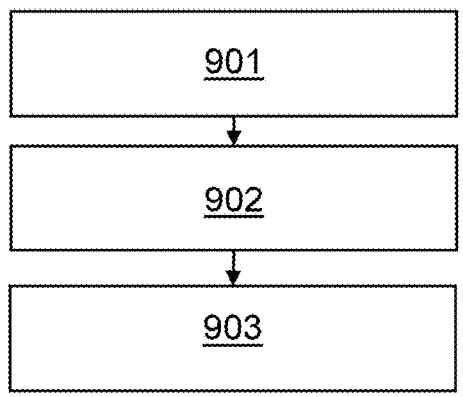
FIG. 9 shows an example method performed by the CAN transceiver.

FIG. 9 shows an example method of operating a Controller Area Network, CAN, transceiver configured to be connected to a CAN bus, the transceiver comprising a transmitter arrangement configured to transmit signalling on the CAN bus based on transmit data received by the transceiver, the transmitter arrangement comprising at least one transmitter configured to operate in a slow transmission mode or a fast transmission mode, wherein in the fast transmission mode the transmitter arrangement is configured to transmit said signalling at a higher baud rate than when the transmitter arrangement is in the slow transmission mode; and a receiver arrangement configured to receive signalling from the CAN bus and a receive output configured to provide received data to the CAN controller based on the received signalling and a decoder; the method comprising:
- receiving 901 transmit data from a transmit input for transmission on the CAN bus;
- operating 902 the transmitter arrangement in the fast transmission mode based on a determination that the transmit data is encoded with a first line code, and decoding the first line code of the transmit data and providing the decoded transmit data to the transmitter arrangement to provide for said transmission of the signalling on the CAN bus; and
- operating 903 the transmitter arrangement in the slow transmission mode based on a determination that the transmit data is not encoded with the first line code.

Figure 10:
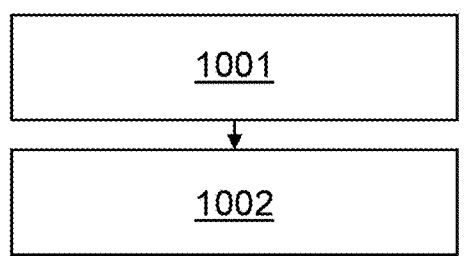
FIG. 10 shows an example method performed by the CAN controller.

FIG. 10 shows an example method of operating a Controller Area Network, CAN, controller configured to be connected to a CAN bus connected CAN transceiver, the CAN controller comprising a transmit output configured to provide transmit data to the CAN transceiver for transmission on the CAN bus; a receive input configured to receive received data from the CAN transceiver representative of received signalling from the CAN bus; and a mode selector configured to provide a controller mode signal that instructs the CAN transceiver to operate in a fast transmission mode rather than a slow transmission mode, wherein the method comprises
- providing 1001 the controller mode signal by providing for the encoding of the transmit data with a first line code to instruct the CAN transceiver to operate in one of the fast or slow transmission modes and, otherwise,
- providing 1002 the controller model signal by providing for the non-encoding of the transmit data with the first line code to instruct the CAN transceiver to operate in the other of the fast or slow transmission modes.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A Controller Area Network, CAN, transceiver configured to be connected to a CAN bus comprising:
   - a transmit input configured to receive transmit data from a CAN controller for transmission on the CAN bus;
   - a transmitter arrangement configured to transmit signalling on the CAN bus based on said transmit data, the transmitter arrangement comprising at least one transmitter configured to operate in a first transmission mode or a second transmission mode, wherein in the first transmission mode the transmitter arrangement is configured to transmit said signalling with a first property and when the transmitter arrangement is in the second transmission mode the transmitter arrangement is configured to transmit said signalling with a second property, different to the first property;
a receiver arrangement configured to receive signalling from the CAN bus;
a receive output configured to provide received data to the CAN controller based on the received signalling; and
wherein the transmitter arrangement is configured to operate in one of the first or second transmission modes based on a determination that the transmit data is encoded with a first line code and configured to operate in the other of the first or second transmission modes based on a determination that the transmit data is not encoded with the first line code, and wherein the transceiver includes a decoder configured to decode the first line code of the transmit data and provide the decoded transmit data to the transmitter arrangement to provide for said transmission of the signalling on the CAN bus at least when the transmitter arrangement is in said one of the first or second transmission modes.

2. The CAN transceiver of claim 1, wherein the transceiver is configured to operate in the first transmission mode based on the determination of the presence of the first line code encoding on the transmit data.

3. The CAN transceiver of claim 2, wherein said transceiver is configured to determine whether or not the transmit data is encoded by the first line code by measuring one or more pulse widths of the transmit data and, if the pulse width is below a threshold time, the transmitter arrangement is configured operate in the first transmission mode and, if the pulse width is above the threshold time, the transmitter arrangement is configured operate in the second transmission mode.

4. The CAN transceiver of claim 1, wherein the first line code comprises a code which gives the transmit data shorter pulse widths than said transmit data that is not encoded with the first line code.

5. The CAN transceiver of claim 1, wherein the transceiver comprises a mode detector configured to determine the presence or absence of the first line code encoding of the transmit data and provide a mode-switch signal to the transmitter arrangement to select either the first transmission mode or the second transmission mode.

6. The CAN transceiver of claim 5, wherein the mode detector is configured to
determine; a logic-low-time comprising the length of time the transmit data was logic low since the last logic high; and
a logic-high-time comprising the length of time the transmit data was logic high since the last logic low; and wherein
the mode detector is configured to, based on the logic-low-time being longer than a first time threshold and the logic-high-time being shorter than a second time threshold, the second time threshold less than that first time threshold, provide the mode-switch signal to the transmitter arrangement to select the first transmission mode; and
the mode detector is configured to, based on the logic-low-time being longer than the first time threshold and/or the logic-high-time being longer than the first time threshold, provide the mode-switch signal to the transmitter arrangement to select the second transmission mode.

7. The CAN transceiver of claim 5, wherein the mode detector is configured to provide the mode-switch signal to the receiver arrangement to select either a first receive mode in which the receiver arrangement is configured to receive signalling having the first property, and a second receive mode in which the receiver arrangement is configured to receive signalling having the second property different to the first property; and
wherein the mode detector is configured to determine; a logic-low-time comprising the length of time the transmit data was logic low since the last logic high; and
a logic-high-time comprising the length of time the transmit data was logic high since the last logic low; and wherein
the mode detector is configured to, based on the logic-high-time being longer than a first time threshold and the logic-low-time being less than a second time threshold, the second time threshold less than that first time threshold, provide the mode-switch signal to the receiver arrangement to select the first receive mode and provide the mode-switch signal to the transmitter arrangement to disable the transmitter arrangement; and
the mode detector is configured to, based on the logic-low-time being longer than the first time threshold and/or the logic-high-time being longer than the first time threshold, provide the mode-switch signal to the transmitter arrangement to select the second transmission mode and the second receive mode.

8. The CAN transceiver of claim 7, wherein the receiver arrangement comprises a first receiver configured to receive signalling with said first property and a second receiver configured to receive signalling with said second property, wherein the mode-switch signal is configured to, in the first receive mode, enable the first receiver and disable the second receiver in the provision of the received data to the receive output, and, in the second receive mode, enable the second receiver and disable the first receiver in the provision of the received data to the receive output.

9. The CAN transceiver of claim 5, wherein the transmitter arrangement comprises a first transmitter configured to transmit signalling with said first property and a second transmitter configured to transmit signalling with said second property, wherein the mode-switch signal is configured to, in the first transmission mode, enable the first transmitter and disable the second transmitter, and, in the second transmission mode, disable the first transmitter and enable the second transmitter.

10. An apparatus comprising a Controller Area Network, CAN, comprising a plurality of nodes, each node comprising the CAN transceiver of claim 1 connected with a CAN controller such that the transmit output of the CAN controller is coupled with the transmit input of the CAN transceiver and the receive output of the CAN transceiver is coupled with the receive input of the CAN controller.

11. A Controller Area Network, CAN, controller configured to be connected to a CAN bus connected CAN transceiver, the CAN controller comprising:
a transmit output configured to provide transmit data to the CAN transceiver for transmission on the CAN bus;
a receive input configured to receive received data from the CAN transceiver representative of received signalling from the CAN bus; and
a mode selector configured to provide a controller mode signal that instructs the CAN transceiver to operate in a first transmission mode rather than a second transmission mode, wherein the controller mode signal is provided by:

the controller being configured to provide for the encoding of the transmit data with a first line code to instruct the CAN transceiver to operate in one of the first or second transmission modes and, otherwise, the controller being configured to provide for the non-encoding of the transmit data with the first line code to instruct the CAN transceiver to operate in the other of the first or second transmission modes.

12. The CAN controller of claim 11, wherein the first line code comprises a code in which the first line coded transmit data has shorter pulse widths than said transmit data that is not encoded with the first line code.

13. The CAN controller of claim 11, wherein the CAN controller is configured to provide the controller mode signal during a CAN transition bit which defines the transition between an arbitration phase of the CAN protocol and a data phase of the CAN protocol and wherein the controller mode signal is provided for a period less than the time of the CAN transition bit and greater than the time for at least four logic level transitions of the transmit data that is encoded with a first line code.

14. The CAN controller of claim 13, wherein the transmit data that is not encoded with the first line code is encoded as non-return-to-zero, NRZ, code.

15. A method of operating a Controller Area Network, CAN, transceiver configured to be connected to a CAN bus, the transceiver comprising a transmitter arrangement configured to transmit signalling on the CAN bus based on transmit data received by the transceiver, the transmitter arrangement comprising at least one transmitter configured to operate in a first transmission mode or a second transmission mode, wherein in the first transmission mode the transmitter arrangement is configured to transmit said signalling with a first property and in the second transmission mode the transmitter arrangement is configured to transmit said signalling with a second property different to the first property; and a receiver arrangement configured to receive signalling from the CAN bus and a receive output configured to provide received data to the CAN controller based on the received signalling and a decoder; the method comprising:

receiving transmit data from a transmit input for transmission on the CAN bus;

operating the transmitter arrangement in one of the first or second transmission modes based on a determination that the transmit data is encoded with a first line code, and decoding the first line code of the transmit data and providing the decoded transmit data to the transmitter arrangement to provide for said transmission of the signalling on the CAN bus; and operating the transmitter arrangement in the other of the first or second transmission modes based on a determination that the transmit data is not encoded with the first line code.

* * * * *